United States Patent

Usui et al.

[11] Patent Number: 6,105,663
[45] Date of Patent: *Aug. 22, 2000

[54] HEAT DISSIPATION UNIT FOR CROSS FLOW TYPE COOLING TOWER AND PROCESS FOR MAKING THE SAME

[75] Inventors: Masahiro Usui, Chigasaki; Shigehira Yamamoto, Hiratsuka; Osamu Goto, Ushiku, all of Japan

[73] Assignee: Ishikawajima-Harima Heavy Industries Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/708,717

[22] Filed: Sep. 5, 1996

[30] Foreign Application Priority Data

Sep. 6, 1995 [JP] Japan ................................... 7-229150

[51] Int. Cl.[7] .................... F28C 1/04; F28C 1/16
[52] U.S. Cl. ............... 165/115; 261/112.1; 261/153; 261/DIG. 11; 261/DIG. 77; 29/890.03; 165/DIG. 163
[58] Field of Search ............... 165/115, DIG. 163; 261/112.1, 153, DIG. 11, DIG. 77; 29/890.03

[56] References Cited

U.S. PATENT DOCUMENTS

| | | | |
|---|---|---|---|
| 3,011,723 | 12/1961 | Van Weele | 239/193 |
| 3,301,401 | 1/1967 | Hall | 210/150 |
| 4,980,098 | 12/1990 | Connery | 165/115 |
| 5,505,882 | 4/1996 | Kato | 261/153 |

FOREIGN PATENT DOCUMENTS

| | | |
|---|---|---|
| 1006482 | 9/1994 | Belgium . |
| 0 661 512 A1 | 7/1995 | European Pat. Off. . |
| 2127990 | 12/1971 | Germany ................ 261/112.1 |
| 6-201279 | 7/1994 | Japan . |
| 7-43086 | 2/1995 | Japan . |
| 1 559 330 | 1/1980 | United Kingdom . |
| 2 081 863 | 2/1982 | United Kingdom . |

*Primary Examiner*—Allen J. Flanigan
*Attorney, Agent, or Firm*—Fish & Richardson P.C.

[57] ABSTRACT

The present invention relates to a heat dissipation unit for cross flow type cooling tower with which it is possible to prevent the emission of white vapor without lowering the cooling power of the cooling tower, and also without requiring troublesome routine operation. In order to accomplish the above object, the heat dissipation unit of the present invention comprises filling plates arranged vertically and parallel with each other so as to form spaces therebetween, each of the filling plates having uneven surfaces down which water to be cooled flows when water to be cooled is supplied onto the filling plates, and cowl members disposed between neighboring filling plates, each of the cowl members including a pair of side plate portions having upper ends and a roof portion connecting the upper ends of the side plate portions. The side plate portions of the cowl members are arranged substantially parallel with the filling plates so as to form gaps between the filling plates and the side plate portions of the cowl members.

8 Claims, 3 Drawing Sheets

HEAT DISSIPATION UNIT FOR CROSS FLOW TYPE COOLING TOWER AND PROCESS FOR MAKING THE SAME

BACKGROUND OF THE INVENTION

The present invention relates to a heat dissipation unit for a cross flow type cooling tower and a process for making the heat dissipation unit.

The conventional cross flow type cooling tower has a general tendency to emit white vapor from the exhaust port thereof in cold weather, and this white vapor is liable to cause anxiety in the neighboring residents. For example, the neighboring residents are likely to believe that the white vapor pollutes the air and to feel an aversion to the white vapor; or they are likely to mistake the white vapor for smoke from a fire when the vapor reflects red light from, for example, of neon signs.

Various attempts have been made in the prior art to prevent the emission of the white vapor from the cross flow type cooling tower. For example, Japanese Patent Application, First Publication No. 3-75495, discloses a cross flow type cooling tower comprising an improved heat dissipation unit. This heat dissipation unit includes a plurality of filling plates vertically arranged parallel with each other so as to make fixed clearance between them, and each of the filling plates has uneven surfaces along which the water to be cooled flows down when the water is sprayed onto the heat dissipation unit. The upper ends of the gaps formed between the neighboring filling plates are closed; or, are covered with cowl members which can be opened, and air passages are formed for emitting only the air from the heat dissipation unit.

However, because the exclusive air passages are provided, the above heat dissipation unit has a drawback that the cooling power is lowered in comparison with conventional ones, and it is necessary to enlarge the size of the cooling tower to obtain the necessary cooling power. Furthermore, in the case where the openable cowl members are provided, opening and closing the cowl members requires a great deal of labor, and makes routine maintenance troublesome.

SUMMARY OF THE INVENTION

It is an object of the present invention to provide a heat dissipation unit with which it is possible to prevent the emission of white vapor without lowering the cooling power of the cooling tower, and also without requiring troublesome routine operation, such as opening and closing operations for cowl members according to changes in the seasons.

In order to accomplish the above object, the heat dissipation unit of the present invention comprises: filling plates arranged vertically and parallel with each other so as to make spaces therebetween, each of the filling plates having uneven surfaces down which water to be cooled flows when water to be cooled is supplied onto the filling plates; and cowl members disposed between neighboring filling plates, each of the cowl members including a pair of side plate portions having upper ends and a roof portion connecting the upper ends of the side plate portions; wherein the side plate portions of the cowl members are arranged substantially parallel with the filling plates so as to form gaps between the filling plates and the side plate portions of the cowl members.

According to the heat dissipation unit of the present invention, hot water to be cooled supplied from above the heat dissipation unit is caught by the roof portions of the cowl members, the water flows into the gaps formed between the side plate portions and the filling plates and it flows down the uneven surfaces of the filling plates. Because the entire amount of water flows down along the uneven surfaces of the filling plates and can contact air horizontally flowing through the spaces between the filling plates, the hot water can be effectively cooled by heat of vaporization. At the same time, moist air is generated.

In contrast, in the water non-supply area of the heat dissipation unit, while the air is flowing through passages surrounded by the filling plates and the cowl members, the air contacts with the dried surfaces of the filling plates which are heated by the hot water contacting the filling plates in the water supply area. Therefore, dry air is generated and it is mixed with the moist air while flowing through the passages, the mixed air which does not contain supersaturated vapor is emitted from the exhaust port of the cooling tower without generating white vapor even when the ambient temperature is low.

The cross flow type cooling tower according to the present invention may also comprise the above-described heat dissipation unit; a water supply for supplying water to be cooled to the upper end of the heat dissipation unit so as to form water supply areas and water non-supply areas on the upper end of the heat dissipation unit; and a water receiver for collecting cooled water flowing down from the lower end of the heat dissipation unit.

It is another object of the present invention to provide a process for making a heat dissipation unit in which process the manufacturing cost can be decreased.

In order to accomplish the above object, the process for making a heat dissipation unit of the present invention comprises the steps of: arranging filling plates in parallel with each other so as to form spaces therebetween; bending plates to form cowl members having a pair of side plate portions and a roof portion connecting the side plate portions to each other; providing spacing means on an outer surface of each of the side plate portions of the cowl members; and inserting the cowl members between the filling plates and fixing the spacing means to the filling plates so as to form gaps between the filling plates and the side plate portions of the cowl members.

According to the above process, because the cowl member can be easily made of a flat plate, it is possible to manufacture the heat dissipation unit at reduced cost.

DETAILED DESCRIPTION OF THE PREFERRED EMBODIMENTS

Referring to FIGS. 1 to 6, the best mode of the heat dissipation unit and the cross flow type cooling tower, and the manufacturing method thereof, according to the embodiment of the present invention, will be explained.

Figure 1:
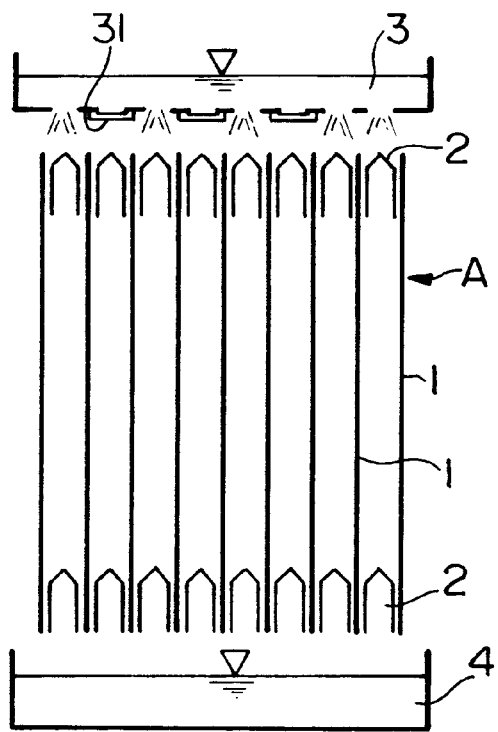
FIG. 1 is a cross section of a cross flow type cooling tower in which a heat dissipation unit of the present invention is used.

As shown in FIG. 1, the cross flow type cooling tower of this embodiment comprises a heat dissipation unit A, an upper water tank 3 provided above the heat dissipation unit A for spraying hot water to be cooled onto the heat dissipation unit A, and a lower water tank 4 provided below the heat dissipation unit A for receiving the cooled water falling from the heat dissipation unit A.

The heat dissipation unit A comprises a plurality of filling plates 1 having a rectangular shape, which are vertically arranged parallel with each other so as to form a constant space therebetween. Each filling plate 1 has uneven surfaces on both faces, and water to be cooled which is sprayed from the upper water tank 3 flows along the uneven surfaces. Between neighboring filling plates 1, cowl members 2 having an inverted gutter shape are horizontally fixed along the upper and lower ends of the filling plates 1.

The cowl member 2 consists of a pair of side plate portions 21 having a long rectangular shape and a roof portion 22 connecting the upper ends of both side plate portions 21. The side plate portions 21 of the cowl members 2 are arranged in parallel with the corresponding filling plates 1 so as to form constant gaps between the filling plates 1 and the side plate portion 21, and these gaps allow passage of water to be cooled and passage of heated air.

Figure 2:
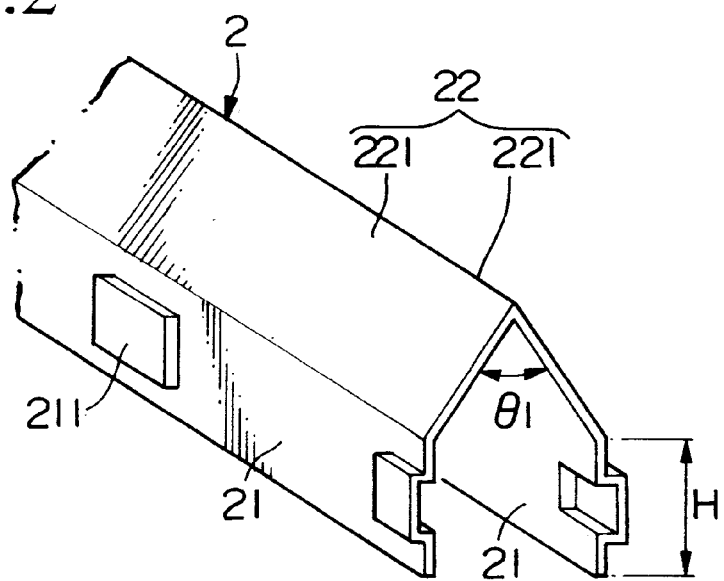
FIG. 2 is a perspective view of a cowl member of the heat dissipation unit of the present invention.

As shown in FIG. 2, a plurality of projections 211 are formed on the outer surface of the side plate portion 21 at a constant intervals along the longitudinal direction of the side plate portion 21, and the projections 211 are bonded to the filling plate 1, for example, by means of an adhesive. Thus, the cowl members 2 are fixed to the filling plates 1 while forming gaps having a constant thickness between the side plate portions 21 and the filling plates 1. The thickness W of the gap is not restricted in the present invention, but is preferably in the range of 2–10 mm, and is more preferably, about 5 mm. The height H of the side plate portion 21 of the cowl member 2 is not restricted in the present invention, but is preferably determined in the range of 20–80 mm according to the size of the cooling tower, and is more preferably, about 50 mm.

The roof portion 22 consists of a pair of inclined plate portions 221 abutted against each other to form an overall inverted "V" section so that the water sprayed from the upper water tank 3 can be dispersed by the roof portion 22. Considering the dispersing effects of the roof portion 22, the angle between the two inclined plate portions 221 is preferably in the range of 100–180°, and more preferably, is about 120°.

The process for making the above heat dissipation unit A will be explained referring to FIGS. 3 and 6. First, a plurality of the filling plates 1 are arranged vertically and parallel with each other so as to make a constant space therebetween to form the skeleton of the heat dissipation unit A.

Figure 3:
FIG. 3 is a cross section of a plate for making the cowl member.
Figure 4:
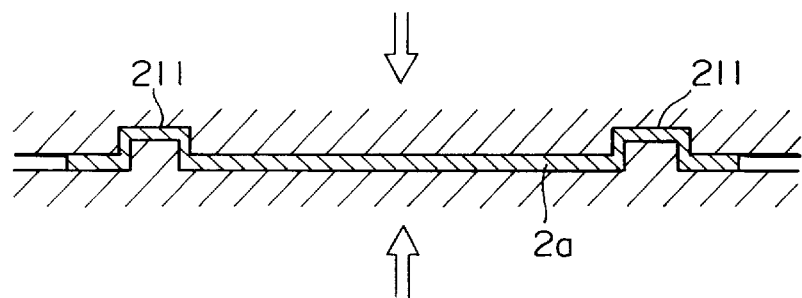
FIG. 4 is a cross section showing a step for forming projections on the plate.

Next, as shown in FIG. 3, flat plates 2a formed from a material having plasticity, for example, plastic or metal, are prepared. After softening the plate 2a by heating, the plate 2a is subjected to press forming for forming the projections 211 as shown in FIG. 4. The method for forming the projections 211 is not restricted to the press forming, but other forming method, such as vacuum forming, can be also employed. The shape of the projection 211 is not limited to a rectangular shape, but can be modified to other suitable shapes, such as a disc shape or a triangular shape.

Figure 5:
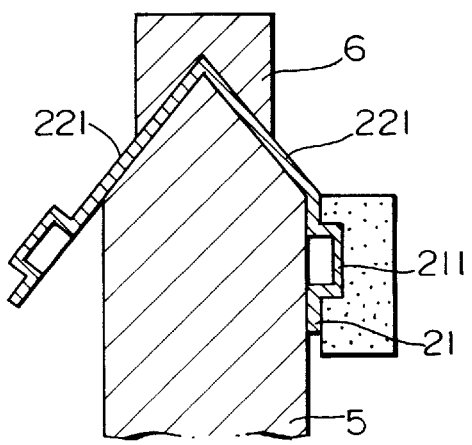
FIG. 5 is a cross section showing a step for folding the plate to form the cowl member.

The plates 2a on which projections 211 are formed are subjected to bending in order to form the cowl member 2 using press dies 5 and 6 as shown in FIG. 5. Each of the press dies 5 and 6 has a press faces having an inverted "V" section and a horizontal length being identical with or longer than the cowl member 2, and the width of the press faces is decided according to the width of the cowl member to be formed. Each plate 2a is pressed between the two dies 5 and 6, if necessary, after heating, and is bent to have an inverted "V" section. Furthermore, both ends of the plate 2a, protruding from the dies 5 and 6, are bent until both ends contact with the side face of the male die 5; thus, it is possible to form the cowl member 2 having a pair of the side plate portions 21 and a roof portion 22.

Figure 6:
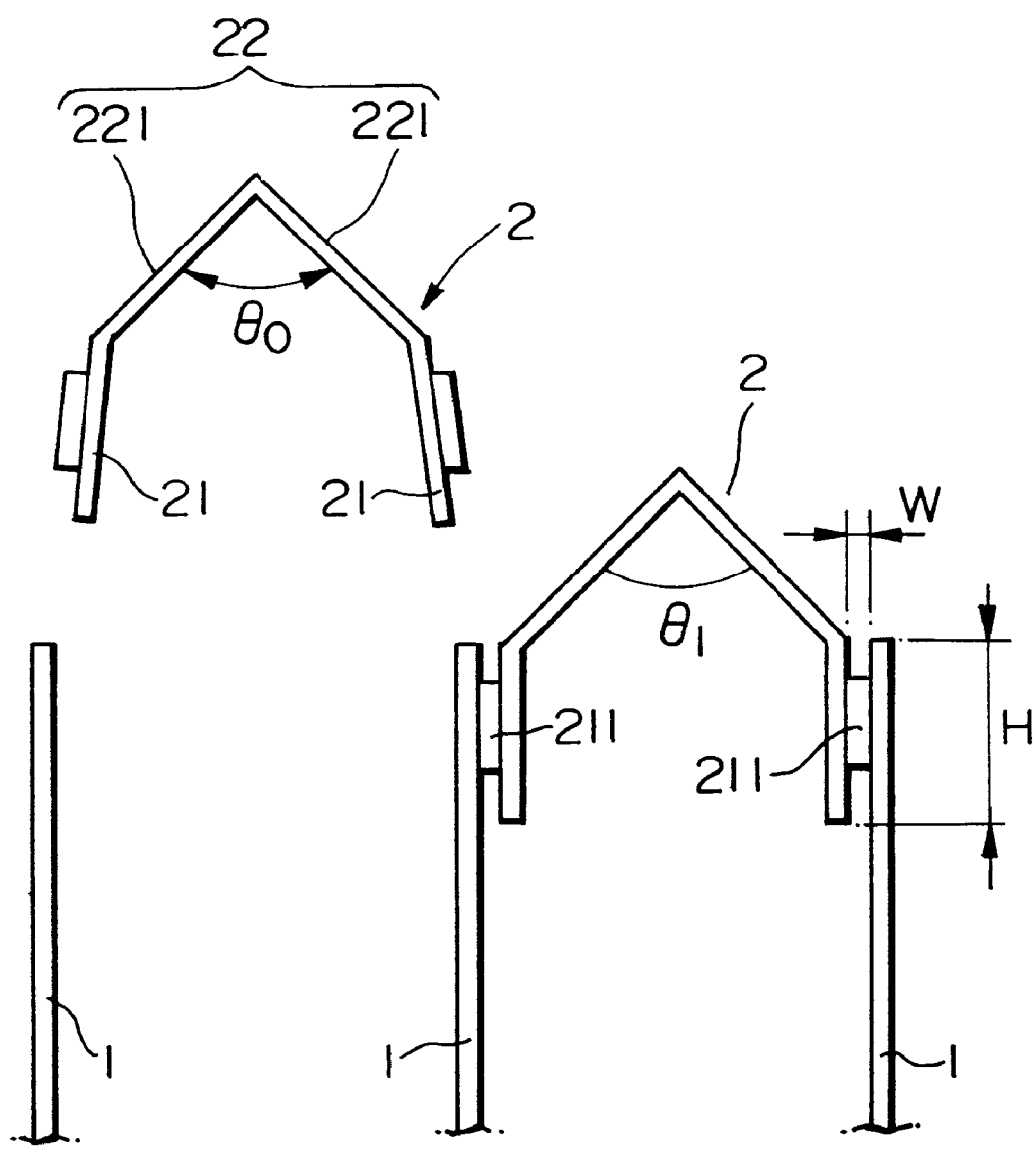
FIG. 6 is a side view showing a step for installing the cowl member on filling plates.

As shown in FIG. 6, when the cowl member 2 is released from the dies 5 and 6, the bending angle of the roof portion 22 will be widened by springing back. Therefore, if the sectional angle of the press faces of the dies 5 and 6 is θ1, which is the sectional angle of the roof portion 22 of the cowl member 2 installed in the heat dissipation unit A, the sectional angle of the roof portion 22 will become η2 being larger than θ1, and the distance between both side plate portions 21 will also be widened compared to the parallel condition. Accordingly, by means of inserting the cowl member 2 into the space between the filling plates 1 while pushing the side plate portions 21 toward each other, it is possible to elastically press the projections 211 against the filling plates 1 after the insertion. Therefore, only by means of applying adhesive agent between the projections 211 and the filling plates 1, it is possible to easily bond the cowl member 2 to the filling plates 1. Furthermore, in the case that the cowl member 2 is formed by bending the flat plate 2a, the cost for manufacturing the heat dissipation unit A can be reduced.

The upper water tank 3 comprises a number of spray nozzles on the bottom thereof and shutters 31 provided on each of the spray nozzles for controlling the amount of the water to be sprayed by each nozzle. It is thereby possible to control the area ratio of a water supply area and a water non-supply area on the upper end face of the heat dissipation unit A. By controlling the area ratio of a water supply area and a water non-supply area, it is possible to control the vapor concentration of the air emitted from the cooling tower so as to prevent the emission of the white vapor. In general, the water supply area should be decreased in cold season in which white vapor can be easily generated, and it should be increased in warm season.

In the water supply area of the heat dissipation unit A, the hot water to be cooled sprayed by the nozzles of the water tank 3 is caught by the roof portions 22 of the cowl members 2, the water flows into the gaps between the side plate portions 21 and the filling plates 1, and it flows down the uneven surfaces of the filling plates 1. While the water is flowing down along the uneven surfaces of the filling plates 1, the water directly contacts with the air which is horizontally flowing through the spaces between the filling plates 1, and the hot water is cooled by heat of vaporization; thus, moist air is generated.

In contrast, in the water non-supply area of the heat dissipation unit A, while the air is flowing through passages surrounded by the filling plates 1 and the cowl members 2, the air contacts with the dried surfaces of the filling plates 1 which are heated by the hot water contacting the filling plates 1 in the water supply area. Therefore, dry air is generated and will be mixed with the moist air while flowing through the passages, and the mixed air which does not contain supersaturated steam is emitted from the exhaust port of the cooling tower without generating white vapor even in the cold seasons.

In the above embodiment, the cowl members 2 are disposed at the upper and lower ends of the filling plates 1; however, the present invention is not restricted to this arrangement. For example, the cowl members 2 can be installed only at the upper end of the heat dissipation unit A; or they can be installed at the upper end and middle portion of the heat dissipation unit A.

Furthermore, instead of the upper water tank 3 shown in FIG. 1, water sprinkler pipes can be provided above the heat dissipation unit A as a water supply means. In this construction, it is easy to control the area ratio of a water supply area and a water non-supply area on the upper end face of the heat dissipation unit A.

What is claimed is:

1. A heat dissipation unit comprising:

filling plates arranged vertically and parallel with each other so as to form spaces therebetween, each of said filling plates having uneven surfaces down which water to be cooled flows when water to be cooled is supplied onto said filling plates; and first cowl members disposed between upper ends of neighboring filling plates; and second cowl members disposed between lower ends of neighboring filling plates;

wherein each of said first and second cowl members includes a pair of side plate portions having upper ends and a roof portion connecting said upper ends of said side plate portions, said side plate portions of said cowl members being arranged substantially parallel with said filling plates so as to form gaps between said filling plates and said side plate portions of said cowl members.

2. The heat dissipation unit according to claim 1, wherein said roof portion of said first and second cowl member comprises a pair of inclined plate portions abutted against each other to form an inverted "V" shape.

3. The heat dissipation unit according to claim 1, wherein each side plate portion is fixed to an adjacent one of said filling plates by means of spacers.

4. The heat dissipation unit according to claim 1, wherein each side plate portion has at least a protrusion projecting towards an adjacent one of said filling plates and said protrusion is fixed to said adjacent filling plate.

5. The heat dissipation unit according to claim 1, wherein a thickness of each gap formed between one of said side plate portions and an adjacent one of said filling plates is in the range of 2–10 mm, and a height of each side plate portion is in the range of 20–80 mm.

6. A cross flow type cooling tower comprising:

a heat dissipation unit having upper and lower ends;

water supply means for supplying water to be cooled to said upper ends of said heat dissipation unit so as to form water supply areas and water non-supply areas on said upper ends of said heat dissipation unit; and a water receiver for collecting cooled water flowing down from said lower ends of said heat dissipation unit;

wherein said heat dissipation unit comprises:

filling plates arranged vertically and parallel with each other so as to make spaces therebetween, each of said filling plates having uneven surfaces down which water to be cooled flows when water to be cooled is supplied onto said filling plates; and first cowl members disposed between upper ends of neighboring filling plates; and second cowl members disposed between lower ends of neighboring filling plates;

wherein each of said first and second cowl members includes a pair of side plate portions having upper ends and a roof portion connecting said upper ends of said side plate portions;

wherein said side plate portions of said cowl members are arranged substantially parallel with said filling plates so as to form gaps between said filling plates and said side plate portions of said cowl members so that water supplied from said water supply means flows down along said filling plates positioned under said water supply areas.

7. A process for making a heat dissipation unit comprising:

arranging filling plates in parallel with each other so as to form spaces therebetween;

folding plates to form first and second cowl members having a pair of side plate portions and a roof portion connecting said side plate portions to each other;

providing spacing protrusions on an outer surface of each of said side plate portions of said cowl members; and inserting said first cowl members between said upper ends of filling plates and fixing said spacing protrusions of said first cowl members to said filling plates so as to form gaps between said filling plates and said side plate portions of said first cowl members; and inserting said second cowl members between lower ends of said filling plates and fixing said spacing protrusions of said second cowl members to said filling plates to form gaps between said filling plates and said side plate portions of said second cowl members;

wherein inserting said first and second cowl members is performed while elastically deforming said first and second cowl members to reduce the width of a space between said side plate portions so that said side plate portions move toward adjacent ones of the filling plates.

8. A heat dissipation unit comprising:

filling plates arranged vertically and parallel with each other so as to form spaces therebetween, each of said filling plates having uneven surfaces down which water to be cooled flows when water to be cooled is supplied onto said filling plates; and cowl members disposed between upper ends of neighboring filling plates, each of said cowl members including a pair of side plate portions having upper ends and a roof portion connecting said upper ends of said side plate portions;

wherein said side plate portions of said cowl members are arranged substantially parallel with said filling plates so as to form gaps between said filling plates and said side plate portions of said cowl members, and a lower end of each side plate portion extending vertically downward.

* * * * *